D. W. GRIFFITH.
METHOD AND APPARATUS FOR PROJECTING MOVING AND OTHER PICTURES WITH COLOR EFFECTS.
APPLICATION FILED MAY 14, 1919.
1,334,853.
Patented Mar. 23, 1920.
2 SHEETS—SHEET 1.
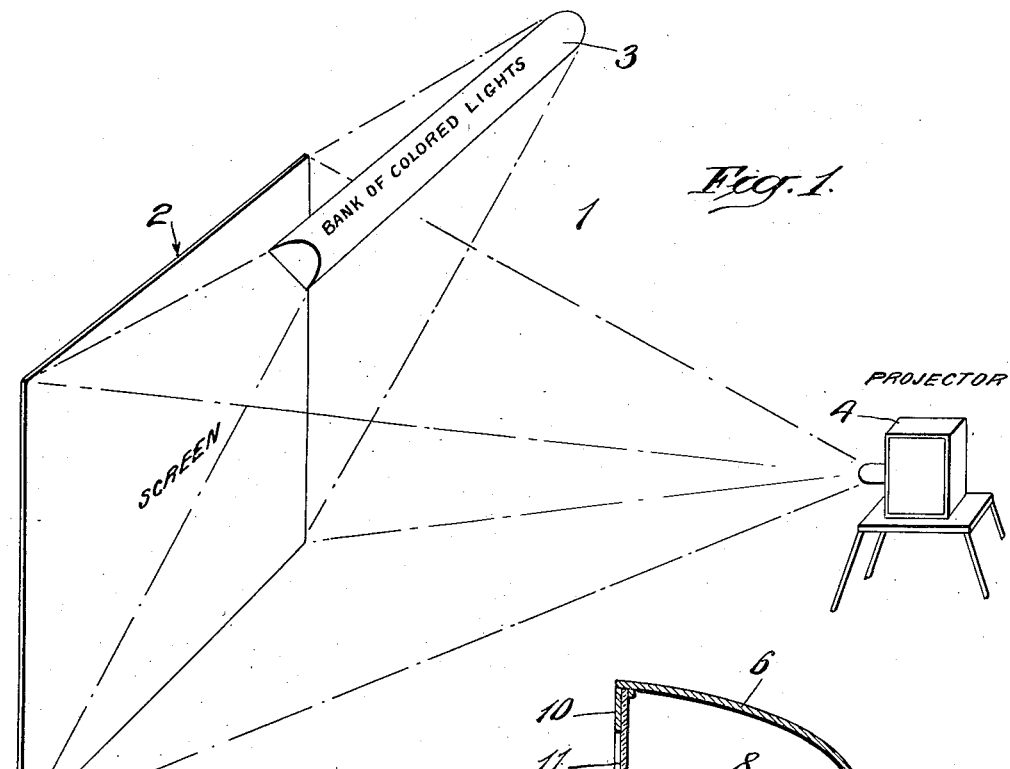
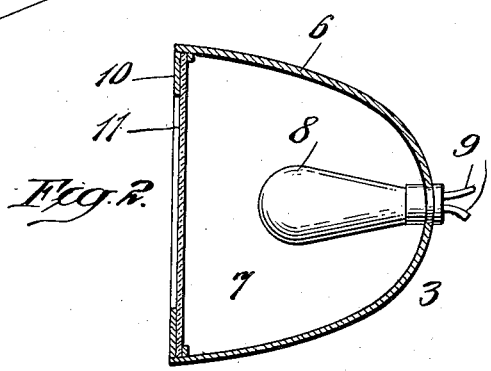
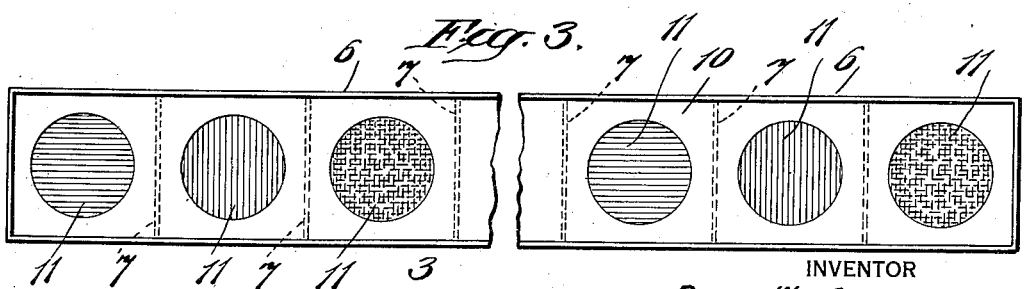
INVENTOR
DAVID W. GRIFFITH
BY
ATTORNEY D. W. GRIFFITH.
METHOD AND APPARATUS FOR PROJECTING MOVING AND OTHER PICTURES WITH COLOR EFFECTS.
APPLICATION FILED MAY 14, 1919.
1,334,853.
Patented Mar. 23, 1920.
2 SHEETS—SHEET 2.
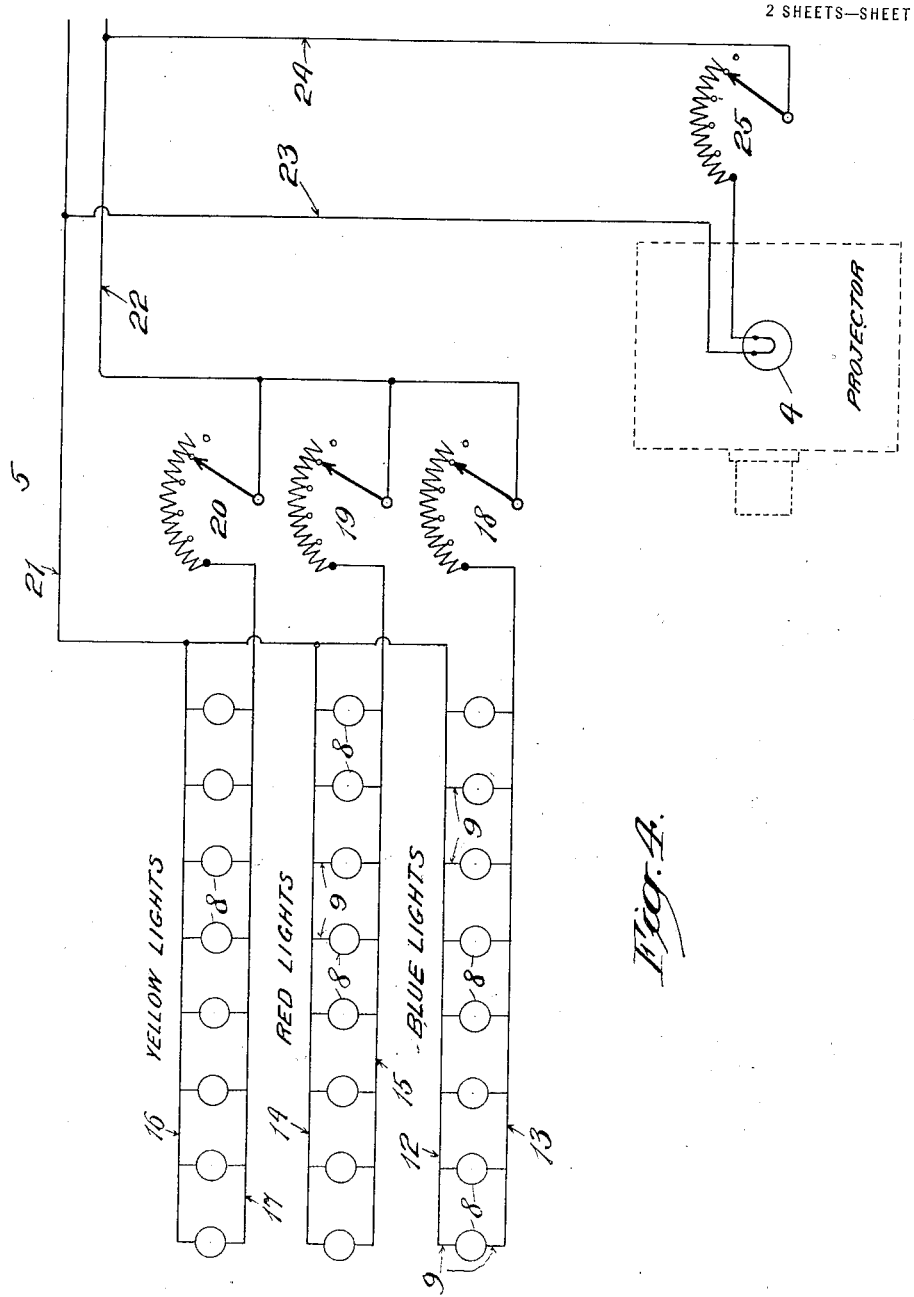
INVENTOR
DAVID W. GRIFFITH
BY
O. Ellery Edwards
ATTORNEY

UNITED STATES PATENT OFFICE.

DAVID W. GRIFFITH, OF LOS ANGELES, CALIFORNIA.

METHOD AND APPARATUS FOR PROJECTING MOVING AND OTHER PICTURES WITH COLOR EFFECTS.

1,334,853.  Specification of Letters Patent.  Patented Mar. 23, 1920.

Application filed May 14, 1919. Serial No. 296,964.

*To all whom it may concern:*

Be it known that I, DAVID W. GRIFFITH, a citizen of the United States, and a resident of the city of Los Angeles, county of Los Angeles, and State of California, have invented a new and useful Improvement in Methods and Apparatus for Projecting Moving and other Pictures with Color Effects, of which the following is a specification.

The object of my invention is to provide an apparatus and process by means of which moving or other pictures may be projected upon an illuminated screen which has colored lights which blend in a happy manner with the pictures thrown upon the screen, so that pleasing color effects can be produced on the screen in an infinite number of intensities and colors, according to the volition of the operators of the apparatus. This and other objects are accomplished by my invention, one embodiment of which is hereinafter more particularly set forth.

For a more particular description of my invention, reference is to be had to the accompanying drawings, forming a part hereof, in which—

Figure 1 is a perspective diagrammatic view of the preferred embodiment of my invention, Fig. 2 is a sectional view through the bank of colored lights for throwing direct and diffused colored light on the screen, Fig. 3 is a front elevation of this bank of light, Fig. 4 is a diagram of the wires and lights used with my invention.

Throughout the various views of the drawings, similar reference characters designate similar parts.

My improved apparatus 1 consists of an opaque screen 2, a bank of colored lights 3, a projector 4, and a wiring system 5. The screen 2 requires no specific description, as it is the ordinary screen used for moving and other pictures, where a projector is employed. Such ordinary screen is opaque in that it receives useful light effects on one side only, and where a cloth is employed the background is non-reflecting. With such screens there are no light effects back of the screen visible to the spectators viewing the pictures. The projector 4 is also the ordinary projector, which is used with such pictures and projects them on the screen in the conventional manner. The bank of colored lights is placed at any convenient location adjacent to the screen, and out of the path of the rays of light from the projector 4 and preferably above the screen in the position indicated in Fig. 1. This bank may be made in any suitable manner, and is preferably made in the form of a long trough 6 in which there are a number of partitions 7 which divide the space in the trough into several distinct compartments, which are so arranged and disposed that light cannot leak from one to another. The trough 6 is bent so as to form a suitable reflector, and has suitable glow lamps 8 mounted therein, one in each compartment, and supplied with electricity from any suitable source by means of the wires 9. The front of the trough 6 is closed by a perforated plate 10, and each perforation is closed by means of a colored diaphragm or screen 11. These diaphragms 11 may be made in any desired color combination, that is, some of them may be one color, and some another, as for example, in the embodiment here shown, the fundamental colors blue, red and yellow, are indicated.

By turning to the wiring diagram shown in Fig. 4, it appears that the glow lights 8 have their wires 9 run to the ordinary main wires, which are here designated 12 and 13 for the blue lights, 14 and 15 for the red lights, and 16 and 17 for the yellow lights. The blue lights are controlled by a rheostat or dimmer 18, the red lights by a corresponding instrument 19, and the yellow lights by one 20. The wires 12, 14 and 16 run to the bus bar 21, and the rheostats 18, 19 and 20 are connected to the other bus bar 22. Wires 23 and 24 connect these bus bars though the projector 4, and its regulator or rheostat 25.

From the foregoing, it is apparent that the bank of colored lights throw a direct and diffused light on the screen which is uniform throughout, and that the color of the light and the intensity of the light is subject to control through the rheostats 18, 19 and 20. If electricity be shut off the red and yellow lights, and turned on to the blue lights, the screen will appear blue, and the images from the projector 4 will be correspondingly colored. By the rheostats 18 and 25, the intensity of illumination of the screen may be varied so that an infinite number of color effects may be produced with one set of colored lights. In a similar way a different illumination may be secured with the red and yellow lights, or if desired, two or more of these sets of lights may be used simultaneously. When in use, the results obtained on the screen are due to a beautiful and harmonious blending of the various colors, as above described.

While I have thus described one embodiment of my invention, it is obvious that it is not restricted thereto, but is broad enough to cover all structures coming within the scope of the annexed claims.

Having thus described my invention, what I claim is:

1. The process of producing colored pictures on an opaque screen which consists of throwing pictures by a projector onto one surface of said screen and simultaneously illuminating the screen with diffused colored light from a bank of colored lights thrown onto the same surface of the screen in a direction oblique to the stream of light from the projector.

2. In an apparatus of the class described, an opaque screen, a projector for throwing pictures onto one surface of said screen, and a bank of colored lights out of the path of light from said projector for throwing diffused colored light onto the same surface of said screen so that a colored picture is shown on an illuminated screen when the apparatus is in use.

3. In an apparatus of the class described, an opaque screen, a projector for throwing pictures onto one surface of said screen, a bank of colored lights with several colors out of the path of light from said projector and adapted to throw colored diffused light onto the same surface of said screen, and means for varying the intensity and color of the light thrown from said bank onto said screen.

4. In an apparatus of the class described, an opaque screen, a projector for throwing pictures onto one surface of said screen, a bank of differently colored lights with several colors out of the path of light from said projector and adapted to throw colored diffused light onto the same surface of said screen, and means for selectively rendering said lights active and thereby the color of the light thrown from said bank onto said screen.

Signed at the city, county and State of New York, this 13th day of May, 1919.

D. W. GRIFFITH.